United States Patent [19]

Howard et al.

[11] Patent Number: 4,476,002

[45] Date of Patent: Oct. 9, 1984

[54] METAL CURRENT CARRIER FOR ELECTROCHEMICAL CELL ELECTRODES

[75] Inventors: Ronald A. Howard, Brook Park; Srinivasan Sarangapani; Lawrence G. Edwards, both of Cleveland, all of Ohio

[73] Assignee: Union Carbide Corporation, Danbury, Conn.

[21] Appl. No.: 393,390

[22] Filed: Jun. 29, 1982

[51] Int. Cl.³ .................. C25B 11/03; C25B 11/00; H01M 4/86

[52] U.S. Cl. .................. 204/283; 429/41; 429/42; 429/44; 429/45; 204/290 R; 427/123; 427/125

[58] Field of Search ................ 429/40, 41, 42, 43, 429/44, 45; 204/252, 283, 290 R; 427/123, 125

[56] References Cited

U.S. PATENT DOCUMENTS

| | | | |
|---|---|---|---|
| 3,077,507 | 2/1963 | Kordesch | 136/86 |
| 3,311,964 | 4/1967 | Hendricks et al. | 29/25.14 |
| 3,556,856 | 1/1971 | Elbert | 136/86 |
| 3,600,230 | 8/1971 | Stachurski | 429/44 |
| 3,787,244 | 1/1974 | Schulmeister et al. | 136/120 |
| 3,899,354 | 8/1975 | Kordesch | 136/86 |
| 3,948,684 | 4/1976 | Armstrong | 136/120 |
| 4,091,176 | 5/1978 | Alfenaar | 429/40 |
| 4,237,195 | 12/1980 | Alfenaar | 429/44 |
| 4,278,525 | 7/1981 | Gestaut | 204/265 |
| 4,345,986 | 8/1982 | Korach | 204/283 |

OTHER PUBLICATIONS

International Society of Electrochemistry, 31st Meeting, Venice, Italy–Sep. 22–26, 1980–Extended Abstracts.

Primary Examiner—John F. Niebling
Attorney, Agent, or Firm—John R. Doherty

[57] ABSTRACT

A metal current carrier for use in fabricating thin electrochemical cell electrodes comprising a thin metal screen having disposed on one side a thin layer of coarse metal particles which at least partially fill the multiple openings in the metal screen and which are sintered to themselves and to the metal screen.

35 Claims, 7 Drawing Figures

METAL CURRENT CARRIER FOR ELECTROCHEMICAL CELL ELECTRODES

Description

TECHNICAL FIELD

The present invention relates to metal current carriers for use in fabricating electrochemical cell electrodes. More specifically, the present invention relates to metal current carriers for use in fabricating air cathodes for fuel cells, industrial electrolytic cells and metal air cells.

BACKGROUND ART

Air cathodes generally consist of three major components. The first component consists of a thin electrolyte-permeable layer facing the electrolyte side of the cell. The second component consists of one or more active layers containing activated carbon and optionally a catalyst, these active layers being located in an intermediate portion of the electrode where the electrochemical reaction takes place. The third component is a wet-proofing layer that faces the gas side of the cell. The whole electrode structure is supported on the first layer which also acts as a current carrier. In the case of a current-producing cell, the current carrier is called a 'current collector' and in the case of an electrolytic cell, the current carrier is called a "current distributor".

In the operation of an air cathode, oxygen from the air is reduced to hydroxide ion ($OH^-$) according to the following reaction:

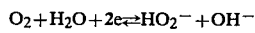

Active carbon used in the intermediate layer of the electrode acts as a catalyst for the oxygen reduction to hydroxide ion; the reaction also produces peroxide ion ($HO_2^-$) as an intermediate product. The peroxide ion is then decomposed to produce additional hydroxide (final product). The decomposition reaction may be represented as follows:

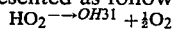

Various catalysts are known for this reaction such as platinum, gold, silver, spinel, etc.

It is important in operation of an air cathode to decompose the peroxide ion as soon as it is formed in the active carbon layer. The peroxide ion, if allowed to accumulate in the active layer in any appreciable amounts, will attack and oxidize the carbon and also give rise to excessive concentration polarization. In order to help alleviate this problem, it has become the practice to include in the active layer a catalyst which will promote the decomposition reaction. The problem with this approach is that the reaction does not proceed at a fast enough rate to decompose all of the $HO_2^-$ without using large quantities of the catalyst, which is expensive and impractical. Consequently, there is a tendency for the peroxide to accumulate along with other reaction products in the active layer of the electrode. This excessive accumulation of $HO_2^-$ interferes with optimum cell operating leading to decreased half cell potential for any given current density and results in decreased electrode life.

It is therefore important to provide for effective mass transport of reaction products from the electrode structure in order to minimize the effects of concentration polarization.

Air cathodes have heretofore employed many different types of metal current collectors. Probably the most common type of current collector has been a wire mesh screen or a similar structure. Electrodes can be easily fabricated using a wire mesh screen simply by pressing the active material onto one side of the screen. The wire mesh screen serves as a conductive member for transporting electrons and also acts as a mechanical support for the electrode structure.

A major problem with the wire mesh screen, however, has been that, due to its relatively smooth surface, the screen does not bond very well with the active carbon layer. The active layer may at times separate from the current collector, particularly if the electrode has been subjected to severe or abusive operating conditions.

U.S. Pat. No. 3,556,856 discloses a three-layer electrode structure which effectively avoids this problem. In this electrode structure, one layer containing the active material is coherently bonded to two other layers that together serve as the current collector. This current collector comprises a first layer of porous metal containing relatively fine pores and a second layer containing coarse metal particles. The first layer may be made from a thin sintered metal plaque composed of fine metal particles, for example, and serves to support the electrode. The second layer, containing coarse metal particles, provides an excellent interface to achieve a strong cohesive bond with the active carbon layer. Although this so-called "biporous" metal current collector offers the advantage of superior electrode strength, the relatively fine pore structure in the support layer can give rise to serious mass transport problems for the reaction products.

It is therefore an important object of the present invention to provide an improved metal current carrier for use in fabricating electrochemical cell electrodes.

Another object is to provide such an improved metal current carrier which will have increased mass transport properties to prevent concentration build-up of reaction products within the electrode.

Still another object of the present invention is to provide an electrochemical cell electrode utilizing such an improved metal current carrier in its fabrication.

Still another object of the present invention is to provide an air cathode of this construction which will significantly increase catalytic activity for decomposing peroxide ions produced in the cell reaction.

Still another object of the present invention is to provide such an air cathode in which intimate, coherent, well-bonded contact between the current carrier and active carbon layer can be achieved.

A further object of the present invention is to provide a novel method for fabricating the improved metal current carrier and air cell electrode.

DISCLOSURE OF THE INVENTION

In accordance with the present invention, there is provided an improved metal current carrier for use in fabricating thin electrochemical cell electrodes and particularly air cathodes for chlor-alkali cells. The metal currant carrier comprises a thin metal screen having disposed on at least one side thereof a thin layer of coarse metal particles. These coarse metal particles at least partially fill the multiple openings in the metal screen and are sintered to themselves and also to the surfaces of the metal screen. The metal particles may be composed of the same metal used to make the metal screen.

In a preferred embodiment of the present invention, the thin layer of coarse metal particles sintered onto one side of the metal screen are coated with a catalyst such as a platinum, gold or silver, for example. Alternatively, the thin layer of coarse metal particles may be composed of one of the metal catalysts, e.g., coarse silver particles.

A preferred metal current carrier in accordance with the present invention comprises a thin nickel screen having disposed on one side thereof a thin layer of silver particles which at least partially fill the multiple openings in the nickel screen and which are sintered to themselves and also to the surfaces of the screen.

The present invention also contemplates the provision of an electrode or air cathode which utilizes the improved metal current collector described hereinabove. Such an electrode or air cathode comprises a thin metal screen which serves as both a conductive member and mechanical support, a thin porous layer containing coarse particles disposed on one side of the metal screen and at least partially filling the multiple openings in the screen, the coarse particles being sintered to themselves and also to the surfaces of the screen, and a porous active layer disposed adjacent to the layer of coarse metal particles. The layer of coarse metal particles provides a rough textured, high surface area interfacial layer which cohesively bonds the reactive layer to the metal screen. A gas-permeable, electrolyte-repellent layer is disposed adjacent to the active layer and constitutes the gas side or face of the electrode.

In a preferred embodiment of the electrode, the coarse metal particles which constitute the rough texture, high surface area interfacial layer are coated with a metal catalyst such as platinum, gold or silver, for example. Alternatively, the coarse metal particles themselves may be composed of one of the metal catalysts sintered directly to the metal screen. It will be observed in either case that, due to the relatively high surface area of the coarse particles at the interfacial layer, large amounts of the metal catalyst may be provided directly at the reaction sites inside the electrode.

A method for fabricating a thin metal current carrier in accordance with the present invention comprises the steps of: preparing a thin metal screen of sufficient size to serve as both a conductive member and mechanical support; coating at least one side of the metal screen with an adhesive; depositing at least one layer of coarse metal particles onto the adhesive so as to substantially cover the exposed surfaces of the metal screen and to at least partially fill the multiple openings in the screen; and heating the metal screen and coarse metal particles to an elevated temperature sufficient to sinter the metal particles to themselves and to the metal screen. The layer of sintered metal particles may then be pressed onto the metal screen in order to further fill the multiple openings in the screen and to densify the finished current carrier.

DETAILED DESCRIPTION

Figure 1:
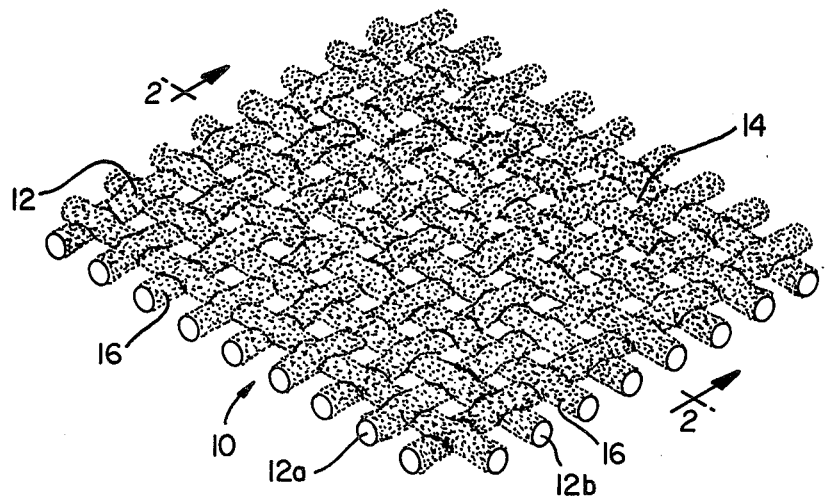
FIG. 1 is a perspective view of a metal current carrier in accordance with the present invention.
Figure 2:
FIG. 2 is a cross-sectional view of the current carrier taken along the lines 2—2 in FIG. 1.

Referring now to the drawing wherein like reference numerals denote identical or similar parts, a metal current carrier 10 embodying the present invention is shown in FIGS. 1 and 2. As shown, the current carrier 10 comprises a metal screen 12 made from wire strands 12a, 12b woven in a conventional manner to form a wire mesh having multiple square shaped openings as generally indicated at 14. The metal screen 12 may be made from nickel wire or other metal (e.g., nickel coated iron) which is passive in the cell environment. The screen 12 may also be woven in a rectangular or other configuration. The dimensions of the wire mesh and strand diameter can vary over a fairly wide range depending upon the current density requirements and strength requirements. Ordinarily, the mesh size will be between $30 \times 30$ mesh and $100 \times 100$ mesh. In the former, the mesh may be woven from 7.3 mil wire and have an opening of about 26 mils. In the latter, the mesh may be woven from a 2 mil wire and have an opening of about 8 mils. The thickness of the screen 12 using the same mesh size indicated above may be between about 4 and 20 mils, for example.

A thin layer 16 of coarse metal particles is disposed adjacent to one side of the metal screen 12. The metal particles in this layer 16 are sintered to one another and also to the surfaces of the screen. The layer 16 covers substantially all of the exposed surfaces on the same side of the metal screen 12 and also at least partially fills the multiple openings 14 in the screen as best shown in FIG. 2.

The metal particles used in the fabrication of the current carrier 10 ordinarily will be composed of the same metal used in the screen 12 although this is not absolutely necessary. Particles of other metals may be used as long as they can be sintered to the metal employed for the screen. For example, it is possible to fabricate the current carrier using a titanium screen along with titanium particles. In a preferred embodiment of the present invention to be hereinafter described, the current carrier can be made with silver particles which also serve as a catalyst in the finished electrode.

The metal particles used in the current carrier should also be coarse particles of a size that will significantly increase the surface area on the screen 12. In many cases, the size of the metal particles will depend to a great extent upon the size of the particular metal mesh employed. For example, if the mesh size is relatively small, say $100 \times 100$ mesh, then the metal particles should be finer than if a larger size mesh, e.g., $30 \times 30$ mesh, is employed. It has been found that as a general rule the metal particles should be of a size that is no greater than one-half the spacing between the wires in the screen nor less than about one-twentieth (1/20th) the size of the screen opening, i.e., its shortest or minimum dimension. Typically, the metal particles should be of a size which will pass a 100 Tyler mesh (5.8 mils) but rest on a 150 Tyler mesh (4.1 mils).

The method for fabricating the metal current carrier in accordance with the present invention may be further described as follows: A wire mesh screen of appropriate size (e.g., 50×50 mesh screen) is first thoroughly coated on at least one side with an adhesive such as a rubber based glue. The sized metal particles (e.g., −100+150 mesh sized particles) are then applied to the adhesive such as by uniformly sprinkling the particles over the surfaces of the coated metal screen. Any excess metal particles which do not contact the adhesive are removed such as by shaking the screen, inverting the screen, or blowing the particles off the screen with a stream of air under low pressure.

The coated metal screen with the layer of metal particles adhered thereto via the adhesive or glue is then placed face up upon the surface of a metal plate, such as an Inconel plate that has been oxidized to prevent sticking, and heated so that the metal particles are sintered both to themselves and to the surfaces of the metal screen. The metal particles and metal screen are preferably heated to sintering temperatures in excess of about 900° C. for periods of from about 20 to 60 minutes. It is usually necessary to employ a non-oxidizing atmosphere around the metal particles and screen during the sintering operation such as, for example, a nitrogen atmosphere. The sintering temperature and atmosphere employed in any given case will, of course, depend upon the particular metal particles and screen that are used in the fabrication of the current carrier. For example, in those cases where the metal particles are composed of nickel, sintering temperatures in the neighborhood of about 1100° C. are employed together with a nitrogen atmosphere (containing a low percentage of hydrogen). On the other hand, if the metal particles are silver particles, then sintering temperatures of about 925°–930° C. are employed together with a nitrogen atmosphere having a slight moisture content.

The thin layer of sintered metal particles is then pressed firmly against the side of the metal screen to at least partly fill the openings and also to improve the particle-to-particle contact. This may conveniently be accomplished by passing the metal screen and sintered particles through a calender roll or a similar device. Generally, the thickness of the current carrier should be reduced in the rolling operation a sufficient amount to attain a void fraction in the particle layer of between about 75 to 85%. If desired, the layer of metal particles and screen may be subjected to additional pressure or rolling to further reduce the void fraction, but care must be taken so as not to overly compress the metal layer and limit its porosity. The layer of metal particles may be sintered again after the rolling or packing operation if so desired to improve the bond strength.

The adhesive used in the above-described method may be any water base latex or heptane base rubber cement, for example. The main requirements of the adhesive are that it dries to a tacky consistency in about 30 seconds and to a total hardness in about 2 to 4 minutes. A particularly good adhesive for use in this method is a rubber cement produced under the trade-name "Scotch Grip Insulation Adhesive No. 34", by 3M Company.

Figure 3:
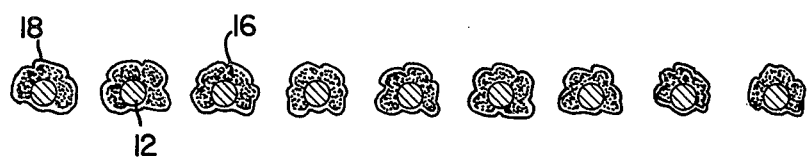
FIG. 3 is a view similar to FIG. 2 but showing a preferred embodiment of the current carrier wherein the layer of coarse particles is coated with a catalyst.

FIG. 3 shows a preferred embodiment of the present invention wherein the thin layer of sintered metal particles is coated with a catalyst. The catalyst covers substantially all of the exposed surfaces on the metal particles to provide a uniform coating of the catalyst as indicated at 18. The catalyst may be any one of a number of conventional catalysts used for promoting the decomposition reaction of the peroxide, such as platinum, gold, or silver, for example, and may be applied by conventional electroplating techniques.

It is not of course necessary to employ the catalyst coating on the layer of metal particles as described hereinabove, and the catalyst, if used, need not be applied as a coating on the initial particles. In the alternative, the catalyst may be employed instead directly in the active carbon layer which is pressed onto the current carrier in the manner to be hereinafter described.

The catalyst may also be incorporated on the current carrier in still another way by making the thin layer of coarse metal particles from one of the metal catalysts, e.g., silver particles. Thus, the current carrier may be constructed in basically the same manner as described hereinabove but instead of employing nickel particles a thin layer of coarse silver particles may be applied to the nickel screen using the same type of adhesive and then sintering the particles at elevated temperatures.

Figure 4:
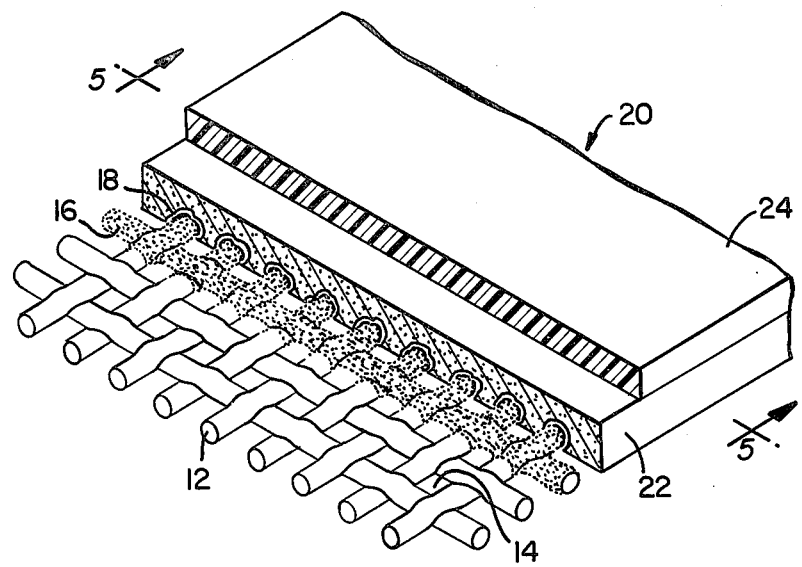
FIG. 4 is a perspective view of an air cathode made using the metal current carrier of the present invention, parts of the air cathode being broken away to show its structure in greater detail.
Figure 5:
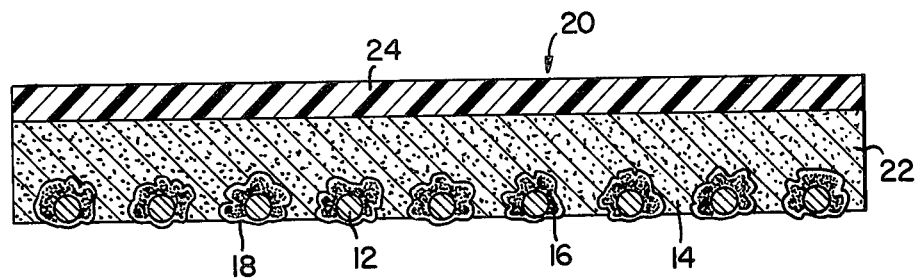
FIG. 5 is a cross-sectional view of the air cathode taken along the lines of 5—5 in FIG. 4.

FIGS. 4 and 5 show a typical air cathode employing a metal current carrier in accordance with the present invention. As shown, the air cathode 20 comprises an active layer 22 containing particles of an active material such as activated carbon. The active layer 22 which is pressed or otherwise applied onto the side of the metal current carrier 10 containing the thin layer of coarse metal particles 16. It will be noted particularly from the view of FIG. 5 that the metal current carrier 10 is almost completely embedded inside the active layer 22 and that the active material fills substantially all of the spaces 14 inside the metal screen. It will be further noted that with this arrangement the coarse metal particles 16 actually provide a rough texture, high surface area interfacial layer which holds the active layer 22 firmly in place on the current carrier 10 and provides for excellent bonding and cohesion therebetween. The high surface area layer of coarse metal particles 16 also substantially lowers the contact resistance between the current carrier 10 and active layer 22.

The active layer 22 may be composed of any particulate active material conventionally employed in electrochemical cells, such as activated carbon as mentioned, graphite, and some metals such as nickel and silver, for example. Generally, the particle size of the activated material will vary depending on the type of material actually used. Typically, the particle size of the active material may vary in a range of from about 0.5 to 10 microns. The active material, e.g., activated carbon, is mixed thoroughly with a plastic binder, optionally a catalyst, e.g., finely-divided silver, and a solvent, preferably an aromatic solvent such as toluene, to produce a pliable mixture which can be easily pressed on to one side of the metal screen. The plastic binder can be any gas-permeable, electrolyte-repellant organic plastic material which is resistant to deterioriation in contact with the cell electrolyte and includes, for example, polyethylene, polytetrafluoroethylene, polyperfluorochloroethylene, polyvinyl chloride, and the like. The active layer may be applied to the current carrier 10 in the form of thin calender sheets (approximately 10–12 mils thick) which are pressed against one side of the current carrier. The active mixture may also be applied by conventional spraying techniques using a suspension of the active material, plastic binder and a solvent.

The air cathode 20 further includes a thin, gas-permeable, electrolyte-repellant layer 24 on its "gas side" as shown in FIGS. 4 and 5. This layer should also be resistant to deterioration in contact with the cell electrolyte and may be composed of the same plastic material used for the binder in the active layer 22.

Figure 6:
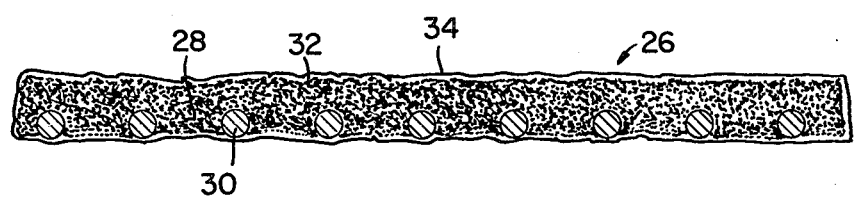
FIG. 6 is a cross-sectional view of a preferred embodiment of the metal current carrier wherein the multiple openings in the wire mesh screen are completely filled with coarse metal particles.

FIG. 6 shows a further embodiment of a current carrier 26 according to the present invention wherein substantially all of the spaces 28 in a metal screen 30, e.g., nickel, are filled with a layer of coarse metal particles 32, e.g., also made of nickel. All of the exposed surfaces of the coarse metal particles may be coated with a catalyst metal 34. This metal current carrier may be constructed in basically the same manner as described before except that in this case an additional layer or layers of coarse metal particles are applied using the same adhesive, followed by pressing the applied layers so as to fill substantially all of the spaces 28 and then sintering the metal particles to the metal screen and themselves. This metal current carrier employs more coarse metal particles than the carriers heretofore described and consequently they provide a greater active surface area and, when catalyst plating or catalyst particles are used, more catalyst metal. However, the additional amount of metal particles used may also substantially reduce the void volume.

In one example it has been shown that a nickel screen weighing 0.040g/cm$^2$, when made into a metal current carrier according to the practice of the present invention by sintering onto one side a layer of nickel particles, weighed 0.074g/cm$^2$ after sintering (i.e., total weight of first layer of nickel particles being 0.034g/cm$^2$) whereas the same current carrier with a second layer of nickel particles sintered thereto weighed 0.118g/cm$^2$ (i.e., a further increase in the nickel particles of 0.044g/cm$^2$). In other words, the second layer of nickel particles weighed approximately 130% more than the first layer of nickel particles sintered onto the metal screen.

In another example, a metal current carrier having one layer of nickel particles sintered onto a nickel screen and measuring approximately 5 inches $\times$ 10 inches $\times$ 0.019 inches thick (volume = 15.56 cc) had an apparent density of 1.52g/cc and a void volume calculated to be 83% using a theoretical nickel density of 9.2g/cc. By comparison, a similar metal current carrier made by sintering and rolling two layers of nickel particles onto a nickel screen and measuring approximately 4.5 inches $\times$ 10 inches $\times$ 0.012 inches thick (volume = 8.85 cc) had an apparent density of 3.86g/cc and a void volume calculated to be 58%, which was considerably less than the void volume of the metal current carrier employing only a single layer. As a further comparison, the void volume of a typical sintered nickel plaque heretofore employed in the fabrication of so-called "biporous" electrodes is about 50% voids.

It has been found that in order to maintain optimum mass transport characteristics in a cathode according to the present invention, the metal current carrier should be constructed in a manner such as to impart a void volume fraction in the range of between about 60 and 85% voids. The percent void volume in the finished electrode can be controlled, particularly in the case where two or more layers of coarse metal particles are employed, by varying the amount of pressure used to compact the metal particles against the metal screen or by varying the size of the metal particles.

Figure 7:
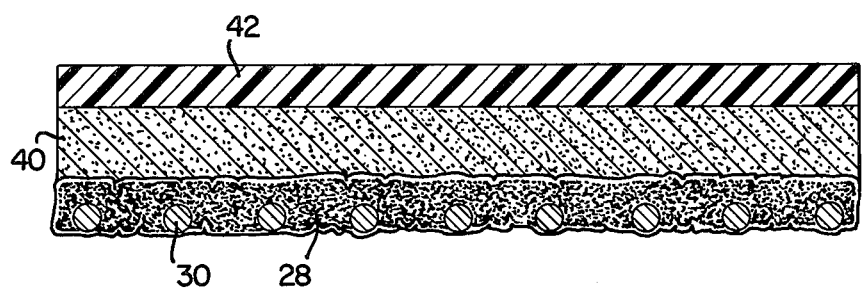
FIG. 7 is a cross-sectional view of an air cathode made using the preferred current carrier shown in FIG. 6.

FIG. 7 shows an air cathode employing a metal current carrier of the multilayer type just described. As shown, the current carrier 26 consists of a metal screen 30 whose openings 28 are substantially completely filled by two or more layers of nickel particles. The nickel particles are applied to the metal screen via an adhesive and sintered in the same manner described hereinabove. The active layer 40 may be made of the same active materials and binder as used in the cathode of FIGS. 4 and 5, e.g., activated carbon, PTFE (polytetrafluoroethylene), etc.. A gas-permeable, electrolyte-repellant material may be employed for the outer layer as shown at 42.

While the description hereinabove has been limited to the use of a metal screen in the fabrication of current carriers, it will be understood that the present invention is not so limited and that other metal structures may be employed as well. For example, it is entirely possible to construct a metal current carrier according to the present invention using an expanded metal instead of a metal screen, e.g., wire screen. For convenience sake, the term "metal screen" shall be interpreted to mean and include expanded metal, both in the specification and in the claims.

The following examples are further illustrative of the practice of the present invention.

EXAMPLE I

A current carrier similar to that shown in FIGS. 1 and 2 was made in the following manner: A 50$\times$50 mesh woven nickel screen made from 5 mil wire and then cold rolled to 7.5 mils thick was sprayed with a very thin layer of a rubber cement (e.g., 3M Company Formula 34 Adhesive). Nickel powder ($-100+150$ Tyler mesh) was quickly sprinkled onto the rubber cement-coated nickel screen. Excess nickel powder was then dumped off. The nickel particles were then sintered to the screen in a furnace set at 1100° C. for 40 minutes in a 97 v/o (volume percent) $N_2$ - 3v/o $H_2$ atmosphere. After completion of sintering, the current carrier was silver plated using standard electroplating techniques.

EXAMPLE II

A current carrier similar to that shown in FIG. 6 was made in the following manner: A 50$\times$50 mesh woven nickel screen made from 5 mil wire and then cold rolled to 7.5 mils thick was sprayed with a very thin layer of rubber adhesive (e.g., 3M Company Formula 34 Adhesive). Nickel powder ($-100+150$ Tyler mesh) was quickly sprinkled onto the rubber cement-coated nickel screen. Excess nickel powder was then dumped off. Another thin layer of the same adhesive was sprayed onto the previously applied metal particles and a second layer of nickel powder ($-100+150$ Tyler mesh) was quickly sprinkled onto the rubber cement-coated nickel particles. Excess nickel powder was again dumped off. The nickel particles were then sintered to the screen and to themselves in a furnace set at 1100° C. for 40 minutes in a 97v/o $N_2$ - 3v/o $H_2$ atmosphere. After sintering, the current carrier was cold rolled to 10–11 mils thickness. After rolling, the current carrier was resintered under the same conditions as above. The current carrier was then silver plated using standard electroplating techniques.

We claim:

1. A metal current carrier for use in fabricating thin electrochemical cell electrodes which carrier comprises: a thin metal screen having disposed on at least one side thereof a thin porous layer of coarse metal particles having a particle size of from about 4.1 to 5.8 mils, said metal particles at least partially filling the multiple openings in the metal screen and being sintered to themselves and also to the metal screen, said porous layer providing a rough textured, high surface area interface for cohesively bonding an active layer to the metal screen.

2. A metal current carrier according to claim 1 in which the thin layer of coarse metal particles are coated with a metal catalyst.

3. A metal current carrier according to claim 2 in which the metal catalyst is selected from the group consisting of platinum, gold and silver.

4. A metal current carrier according to claim 1 in which the thin metal screen is a nickel screen and in which the thin layer of coarse particles comprises nickel particles.

5. A metal current carrier according to claim 1 in which the thin metal screen is a nickel screen and in which the thin porous layer of coarse metal particles comprises silver particles.

6. A metal current carrier according to claim 1 in which the void volume of the thin porous layer of coarse metal particles is between about 60 and 85% voids.

7. A metal current carrier according to claim 6 wherein the void volume is between about 75 and 85% voids.

8. A metal current carrier according to claim 1 in which the thin porous layer of the coarse metal particles fills substantially all of the open spaces in the metal screen.

9. A metal current carrier according to claim 8 in which the void volume of the thin porous layer of coarse metal particles is at least about 60% voids.

10. A metal current carrier according to claim 8 in which the thin layer of coarse metal particles are coated with a metal catalyst.

11. A metal current carrier according to claim 10 in which the metal catalyst is selected from the group consisting of platinum, gold and silver.

12. A metal current carrier according to claim 1 in which the metal screen is a wire mesh woven in a substantially square configuration.

13. A metal current carrier according to claim 11 in which the mesh size of the woven screen is between 30×30 mesh and 100×100 mesh.

14. A metal current carrier according to claim 1 in which the metal screen is a wire mesh woven in a substantially rectangular configuration.

15. A metal current carrier according to claim 13 in which the wire mesh is woven from 2 mil wire and has an opening size of about 8 mils.

16. A metal current carrier according to claim 1 in which the metal particles are of a size that is no greater than one-half the minimum spacing between the wires in the wire mesh nor less than about one-twentieth the minimum spacing between the wires in the wire mesh.

17. A metal current carrier according to claim 16 in which the metal particles are of a size which will pass a 100 Tyler mesh but rest on a 150 Tyler mesh screen.

18. An electrochemical cell electrode which comprises, in combination:

(a) a thin metal screen which serves as both a conductive member and mechanical support;

(b) a thin porous layer containing coarse metal particles disposed on one side of the metal screen and at least partially filling the multiple openings in the screen, the coarse metal particles having a particle size from about 4.1 to 5.8 mils, and being sintered to themselves and also to the metal screen;

(c) a porous active layer disposed adjacent to the layer of coarse metal particles, said layer of coarse metal particles providing a rough textured, high surface area interfacial layer which cohesively bonds the active layer to the metal screen; and (d) a gas-permeable, electrolyte-repellent layer disposed adjacent to the active layer and constituting the gas side of the electrode.

19. An electrochemical cell electrode according to claim 18 in which the thin porous layer of coarse metal particles is coated with a metal catalyst.

20. An electrochemical cell electrode according to claim 19 in which the metal catalyst is selected from the group consisting of platinum, gold and silver.

21. An electrochemical cell electrode according to claim 18 in which the thin metal screen is a nickel wire mesh and in which the thin porous layer of coarse metal particles comprises nickel particles.

22. An electrochemical cell electrode according to claim 18 in which the thin metal screen is a nickel wire mesh and in which the thin porous layer of coarse metal particles comprises silver particles.

23. An electrochemical cell electrode according to claim 18 in which the void volume of the layer of metal particles is between about 60 and 85% voids.

24. An electrochemical cell electrode according to claim 18 in which the coarse metal particles of the thin porous layer substantially fill all of the openings in the metal screen.

25. An electrochemical cell electrode according to claim 18 in which the porous active layer comprises particles of activated carbon, graphite or a metal selected from the group consisting of nickel and silver.

26. An electrochemical cell electrode according to claim 25 in which the porous active layer comprises particles of activated carbon and a plastic binder and in which the plastic binder is an electrolyte-repellant material.

27. An electrochemical cell electrode according to claim 26 in which the plastic binder is selected from the group consisting of polyethylene, polytetrafluoroethylene, polyperfluorochloroethylene, and polyvinyl chloride.

28. An electrochemical cell electrode according to claim 18 in which the gas-permeable, electrolyte-repellant layer is composed of a plastic material selected from the group consisting of polyethylene, polystyrene, polytetrafluorochloroethylene, and polyvinyl chloride.

29. A method for fabricating a thin metal current carrier which comprises the steps of:

(a) preparing a thin metal screen of sufficient size to serve as both a conductive member and mechanical support;

(b) coating at least one side of the metal screen with an adhesive;

(c) depositing at least one layer of coarse metal particles onto the adhesive so as to substantially cover the exposed surfaces of the metal screen and to at least partially fill the multiple openings in the screen; and (d) heating the metal screen and coarse metal particles to an elevated temperature sufficient to sinter the metal particles to themselves and to the metal screen.

30. A method according to claim 29 in which the layer of coarse metal particles is pressed against the metal screen after sintering in order to fill the openings in the screen and to densify the current carrier structure.

31. A method according to claim 29 in which the thin layer of coarse metal particles are coated with a metal catalyst.

32. A method according to claim 31 in which the metal catalyst is selected from the group consisting of platinum, gold and silver.

33. A metal current carrier for use in fabricating thin electrochemical cell electrodes which carrier comprises: a thin metal woven screen having disposed on at least one side thereof a thin porous layer of coarse metal particles wherein the woven screen has a mesh size of between 30×30 mesh and 100×100 mesh and wherein the metal particles have a particle size of from about 4.1 to 5.8 mils, said metal particles at least partially filling the multiple openings in the metal screen and being sintered to themselves and also to the metal screen, said thin porous layer having a void volume of between about 60 and 85% voids.

34. A metal current carrier for use in fabricating thin electrochemical cell electrodes which carrier comprises: a thin metal woven screen having disposed on at least one side thereof a thin porous layer of solid, coarse, catalytic metal particles wherein the woven screen has a mesh size of between 30×30 mesh and 100×100 mesh and wherein the catalytic particles have a particle size of from about 4.1 to 5.8 mils, said catalytic metal particles at least partially filling the multiple openings in the metal screen and being sintered to themselves and also to the metal screen, said thin porous layer having a void volume of between about 60 and 85% voids.

35. A metal current carrier for use in fabricating thin electrochemical cell electrodes which carrier comprises: a thin metal screen having disposed on at least one side thereof a thin porous layer of coarse metal particles having a particle size of from about 0.3 to 10 mils, said metal particles at least partially filling the multiple openings in the metal screen and being sintered to themselves and also to the metal screen, said porous layer providing a rough textured, high surface area interface for cohesively bonding an active layer to the metal screen.

* * * * *

UNITED STATES PATENT AND TRADEMARK OFFICE
CERTIFICATE OF CORRECTION

PATENT NO. : 4,476,002
DATED : October 9, 1984
INVENTOR(S) : Ronald A. Howard, Srinivasan Sarangapani and Lawrence G. Edwards It is certified that error appears in the above-identified patent and that said Letters Patent is hereby corrected as shown below:

In Column 1, line 42, the formula "$HO_2 \longrightarrow OH31_{+\frac{1}{2}O_2}$" should read -- $HO_2^- \rightarrow OH^- + \frac{1}{2}O_2$ --; in line 56, "$HO_2-$" should read -- $HO_2^-$ --.

In column 2, line 63, the word "currant" should be -- current --.

Column 10, line 55, after "polystyrene," the word "polytetrafluoroethylene" should be added.

Signed and Sealed this

Eleventh Day of June 1985

[SEAL]

Attest:

DONALD J. QUIGG

Attesting Officer    Acting Commissioner of Patents and Trademarks